UNITED STATES PATENT OFFICE.

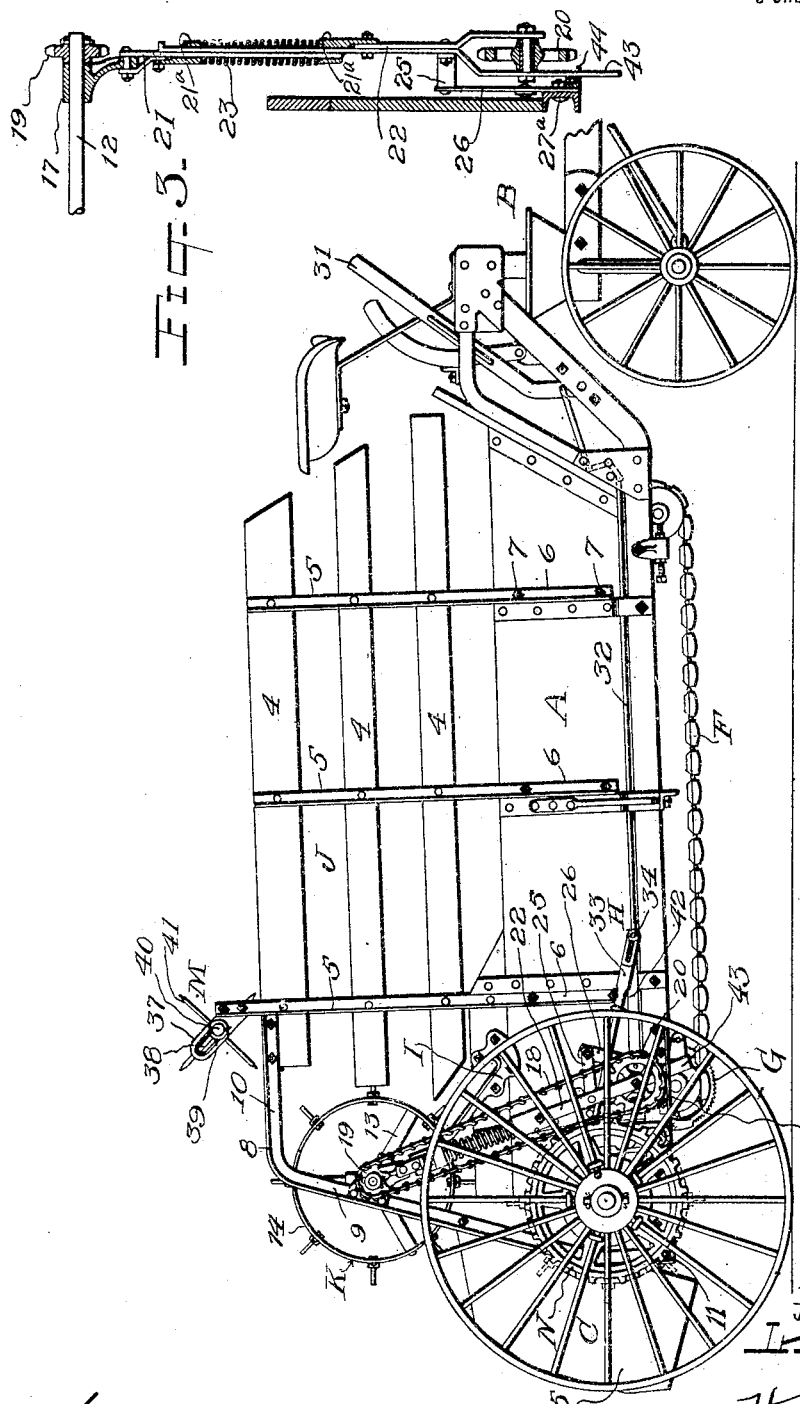

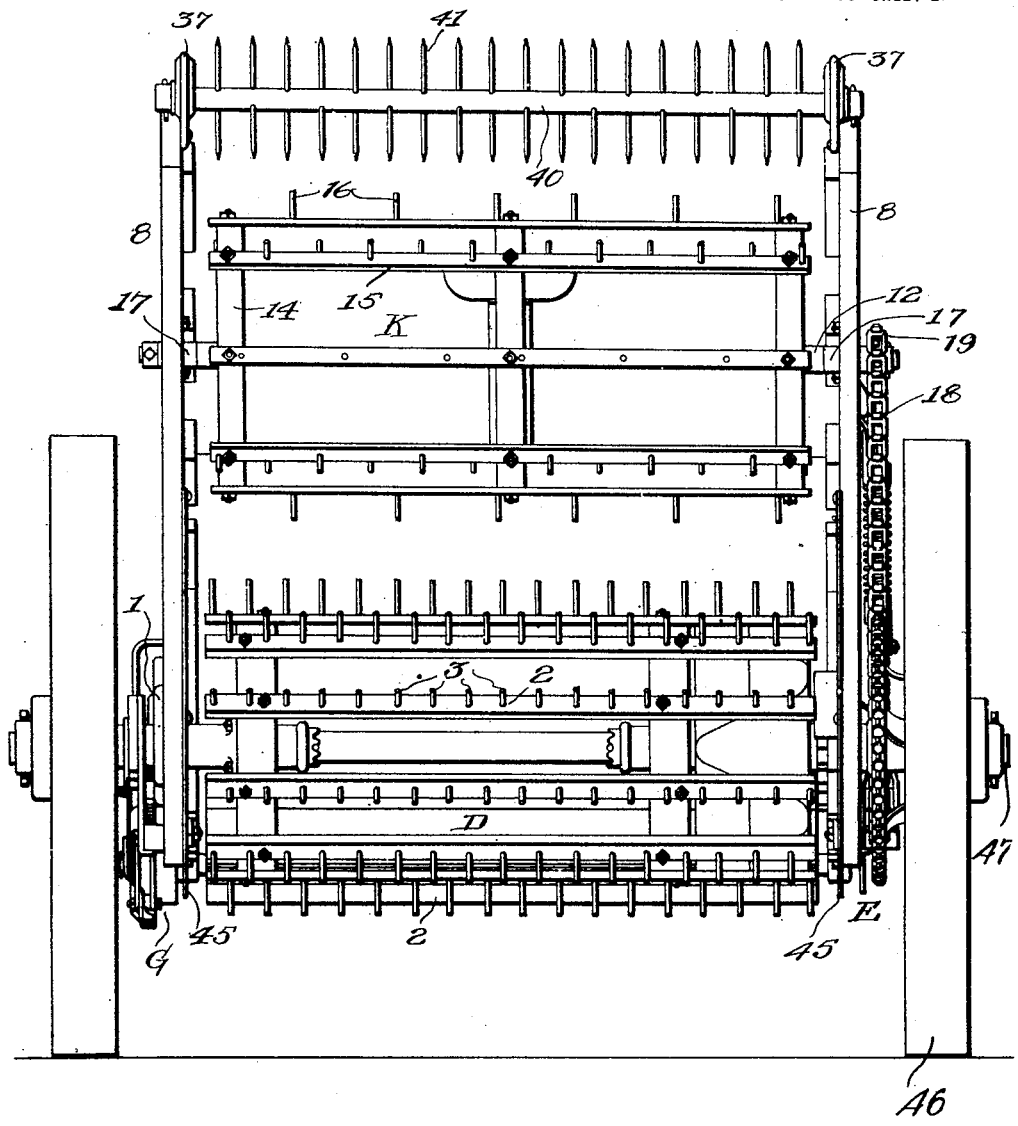

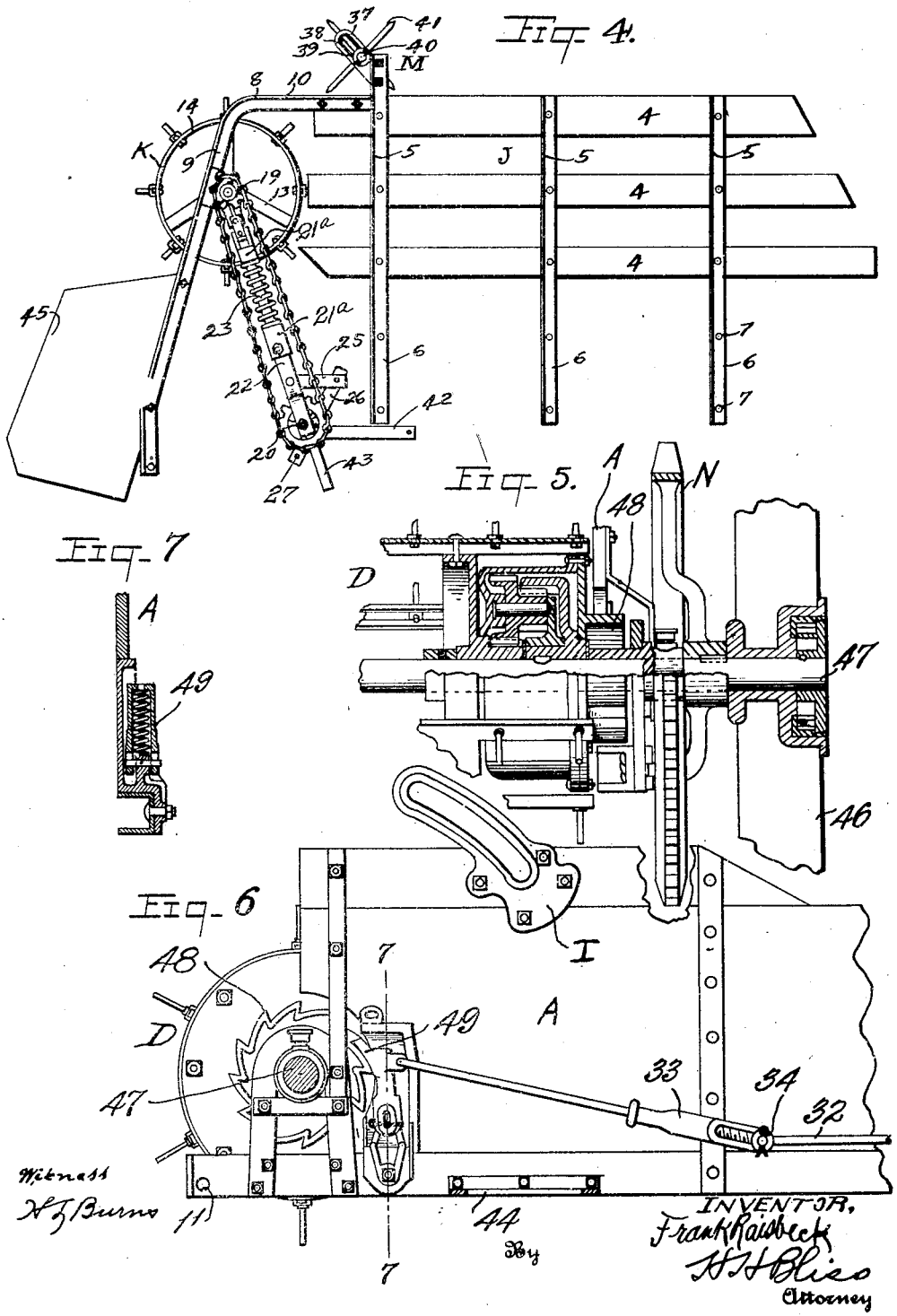

FRANK RAISBECK, OF MOLINE, ILLINOIS, ASSIGNOR TO DEERE & COMPANY, OF MOLINE, ILLINOIS, A CORPORATION OF ILLINOIS.

FERTILIZER-SPREADER.

1,368,053.   Specification of Letters Patent.   Patented Feb. 8, 1921.

Application filed August 27, 1919. Serial No. 320,190.

*To all whom it may concern:*

Be it known that I, FRANK RAISBECK, a citizen of the United States, residing at Moline, in the county of Rock Island and State of Illinois, have invented certain new and useful Improvements in Fertilizer-Spreaders, of which the following is a specification, reference being had therein to the accompanying drawing.

This invention relates to improvements in spreading mechanisms of the class used in farm work for distributing fertilizing materials over the surface of the ground. Materials of two sorts are thus largely utilized. Stable or barnyard manure is a type of those of one class, such materials being compact, solid and heavy. Straw is a type of those in the other class which are light and open.

The loads of materials of the first class must be relatively small; while those of the second class obviously must for economy be much deeper and larger.

The object of the present invention is to provide an apparatus which will enable the farmer to, first, handle heavy manures for a period of time, and then, with but little labor or inconvenience, modify the apparatus so that he can carry large loads of straw or lighter materials and effectually distribute them.

Figure 1 is a side view of a spreading mechanism embodying my improvements.

Fig. 2 is an elevation from the rear end.

Fig. 3 is a sectional view of some of the parts of the driving devices of the upper cylinder.

Fig. 4 is a side view of the extension element for the body.

Fig. 5 is a view partly in elevation, partly in section, showing a traction wheel hub, the transmission gear for driving the lower beater drum, and the gear for actuating the power transmitter for the upper drum.

Fig. 6 is a side view of parts at the rear end of the body, the ground wheel and other elements being removed.

Fig. 7 is a vertical section on the line 7, 7, Fig. 6.

The apparatus as an entirety comprises two elements. The main element is a spreader adapted for use in handling and distributing manures of the heavier sorts. It comprises the body A, the front support or wheeled truck B, the wheel and axle structure C at the rear, the beater D, the power transmitter or beater driving devices E, the load supporting and feeding apron F, the apron operating mechanism G and manual controlling devices H for throwing the power transmitter into and out of operation.

The details of these sets of parts may be of any ordinary or preferred sort. The body A has a sill frame, vertical side boards and an inclined front board, and is supported by brackets on the rear axle. The feed apron F constitutes the floor or bottom of the body, and, driven by the mechanism at G, advances the load mass toward the beater D. The latter is in the present mechanism mounted directly upon the axle of the rear wheels and is formed in the usual way with hubs on the axle, spiders at the ends and intermediate parts of the axle, the transverse finger bars 2 on the spiders and the fingers 3 on the bars. This beater is rotated by the mechanism at E, comprising a set of planetary gear parts, and having in combination therewith a series of movable stop devices controllable by the operator at option when he desires to connect the beater with the ground wheel. The control devices for starting and stopping the beater driving mechanism comprise a hand lever 31 accessible to the driver when in his seat, a link or sliding rod 32 and a stop dog in the path of the aforesaid movable stop lug in the driving mechanism, the dog being carried by the arm 33 pivoted at 34 to the link or slide rod 32. When the dog is in engagement with a movable lug on the driving apparatus the gearing elements are so related that rotation is transmitted from the drive wheel to the beater; but when the dog is drawn away from the lug by pulling forward the link 32 and the arm 33, the gearing is permitted to rotate idly and the beater stops.

The beater on its inner side picks up the material, carries it upward and over the top and delivers it backward. And I shall herein refer to it as an over-delivery beater.

I, I indicate bracket plates which are attached to the body and are formed with slots adapted to receive bearing boxes or blocks of a rotary rake. The latter consists of a shaft with relatively long fingers, the ends of the shaft being mounted in the boxes or bearing blocks which are fitted in the slots. The rake engages with the top stratum of material and as the latter moves backward toward the beater it rotates the rake, the teeth of which act to control the movement of the top portion of the mass in relation to the teeth of the beater.

N indicates a relatively large sprocket wheel secured to the ground wheel C' adjacent the power transmitter, which rotates the beater D; this sprocket wheel being for a purpose to be described.

The other element of the present apparatus may also be regarded as a unitary structure, though its parts may be formed separately from each other. It comprises rack-like wall sections and suitable frame parts. The racks are formed of horizontal slats or bars in two series, those of each series being secured together by frame bars 5 having extensions 6 with bolt apertures at 7. At the rear I provide a supplemental framework of angle bars 8, these being shaped to have relatively short upper horizontal parts 10 and inclined parts 9 extending downward and backward. At their upper ends these rear frame bars are firmly secured to the upper part of the rack frames J, and at their lower ends they are adapted to be firmly bolted at 11 to a suitable base. The frame thus provided is utilized to furnish firm support for a large distributing beater K. It comprises a central shaft 12, two or more spiders 13 carrying peripheral rings 14, supporting transverse bars 15 with straw engaging fingers 16. The ends of the shaft 12 are mounted in bearings at 17, bolted to the inclined parts of the frame bars 8.

A driving mechanism for rotating the beater is also mounted upon the frame. As shown, it comprises a sprocket mechanism having the chain 18, the driven sprocket wheel 19, on the end of the beater shaft 12, and a sprocket wheel 20 for driving the chain. This wheel and the chain are suspended in a swinging support having an upper section 21 supported at the axis of the shaft 12, and a lower section 22 in which the wheel 20 is mounted. The sections of the swinging support are longitudinally slidable relative to each other, governed by stops as at 21ª, and are provided with a spring 23 interposed between them, which normally tends to move the lower section with its wheel 20 downward, and thus act to keep the chain 18 under proper tension.

43 is a bracing guide adapted to be fitted loosely in a suitable holder for preventing the swinging sprocket carrier, and particularly the lower sprocket wheel 20, from yielding laterally and holding them properly in predetermined vertical planes.

25 is a link pivoted to the lower end part 22 of the swinging support, and at its other end it is pivotally connected to an arm 26 having a pivot receiving aperture at 27. When the arm 26 is properly pivoted to a suitable holder it serves as a means to cause the driving sprocket system to swing forward and back.

37, 37 are bracket plates secured to the rack frames. They have backward and upward slots 38 adapted to receive the bodily movable bearings or boxes which carry the rotary fingered gate.

45, 45 indicate shields or guard plates which act effectually to prevent straw being thrown by the beater or carried by the wind toward the ground wheels or into the gearing or movable power transmitting parts near said wheels.

The second, the extension, element, just described, can be readily applied to the main element or lower spreader mechanism, which is done when the user desires to carry deep large masses of straw or light material to the field and distribute it uniformly on the ground. To so apply the extension element and its parts into proper relations with the several parts of the lower element, its vertical frame bars 5 are secured by bolts at 7 to the vertical walls of the body, the vertical bars on one preferably contacting at their side edges with those of the other, so as to secure a firm bracing. The frame extensions 8, projecting rearward and downward at an inclination from the rack frame, are rigidly fastened at 11 to the main sill frame.

The bracing guide 43 is inserted into the slot or guideway provided by the part 44 secured rigidly to the sill, these devices holding the sprocket mechanism properly in relation to the teeth on the driving wheel N. The devices for swinging the sprocket power transmitter are then connected by pivoting the swinging bar 26 to the bottom sill at 27ª, and also pivotally connecting it to the link or slide rod 32 of the manual control system by which the operator stops and starts the transmitter E which rotates the bottom beater D. The bodily movable and rotary gate M is detached from the bracket plates I, I, on the lower structure, and is mounted in the slots 38 in the bracket bearing plates 37 carried by the rack frame.

The sprocket devices including the chain 18, the wheels 19 and 20, and their swinging support are virtually carried by the upper or extension element of the mechanism independently of the lower element. The chain 18 is driven by its engagement with two or three teeth only, and on one side of the wheel N only, the chain having its lower part arranged to swing bodily with the idle wheel G. If the chain were fitted in the ordinary manner around the periphery of the sprocket wheel (instead of being merely part of a self-contained driving mechanism independent of the wheel) the farmer would be required to open its links whenever attaching or detaching the upper element of the apparatus. Again, it would be difficult to provide a prime driver for the chain 18, which could be quickly stopped when throwing the upper beater A out of operation. The power transmitter at E has parts which are concentric with the drive wheel and its axle, and which are mainly inside of the planes of rotation of the end part of the beater D, and it would be difficult to extend the transmitter outward laterally to provide a driver for the upper beater. But by introducing a simple driving sprocket wheel, as at M, placing the chain 18, as an entirety, and its support, at the side of the wheel, and employing the swinging link connection at 26, 27, I provide means for readily throwing the two beaters simultaneously out of action without requiring any lateral extension of the parts constituting the power transmitting devices at E.

With a mechanism such as I have devised, when the operator disconnects the power devices from the lower beater, he simultaneously swings forward the sprocket carrier or support 21, 22, by pulling on the arm 26 through the link 41, pivoted to the draw rod or link 32 of the control devices; and this disengages the chain 18 from the sprocket wheel 24; and thereupon the upper beater is thrown out of action and it ceases rotating.

The manner of operating the mechanism (comprising both of the elements) when used for carrying and distributing straw or similar light materials will be readily understood. When the machine reaches the field with its load and the distributing is to be commenced, the operator by lever 31 engages the stop with the transmitting devices at E and simultaneously swings the chain support 21, 22 toward the chain driving wheel, and thereupon both of the beaters D and K commence rotating, each acting as an over delivery distributer, as above described. The lower beater engages with the straws at the rear end of the lower part of the mass, which is being slowly fed backward by the apron and carries them up and then throws them backward. The upper beater through its lower in-moving fingers, serves as a regulator for the straw mass which the fingers of the lower beater induce to move backward through the space between the two beaters, their axes being in substantially the same vertical plane. The fingers of the upper beater then rise and remove straws from the rear end of the upward part of the backward moving mass and whirl them with an over-delivery action to the rear of the machine. The regulator for the straws of the uppermost stratum is the bodily self-adjustable, rotary rake M, which checks the backward movement of any straws which are too high to be engaged with, and thrown backward by, the fingers of the upper beater, and brings such high straws down to the proper line.

After the material of the load has been distributed the operator stops the rotation of the beaters simultaneously by means of the single lever 31 acting through the trains of parts above described.

What I claim is:

1. The herein described extension element for extending vertically a fertilizer distributer which latter has a body, a beater cylinder, a traveling bottom, ground wheels, means for rotating said beater cylinder and also a supplemental traction-actuated driving device for a beater cylinder, said extension element having a framework with side walls, a beater cylinder and a power transmitter for the last said beater cylinder comprising a train of permanently interengaging parts held fixed in operative positions in relation to each other, and adapted to be separably connected operatively as a unit to the aforesaid supplemental driving device.

2. The herein described extension element for extending vertically a fertilizer distributer which latter has a body, a beater cylinder, a traveling bottom, ground wheels, a power transmitter between the ground wheels and the said beater cylinder and a supplemental power transmitter actuated by a ground wheel, said extension element having a frame, side walls, a beater cylinder on the frame, a power transmitter permanently connected to the last said beater cylinder and comprising a train of permanently interengaging parts held fixed in operative relations with each other and adapted to be separably connected to the said supplemental power transmitter, in combination with manually controlled means adapted to simultaneously throw both beater cylinders into and out of action.

3. The herein described extension element for extending vertically a fertilizer distributer which latter has a body, a beater cylinder, a traveling bottom, ground wheels, a power transmitter between the ground wheels and the said beater cylinder, a supplemental power transmitter actuated by a ground wheel, and manually controlled means for throwing the said beater cylinder into and out of operation, said extension element having a frame, side walls, a beater cylinder on the frame, a power transmitter permanently connected to the last said beater cylinder and comprising a train of permanently interengaging parts held fixed in operative relations with each other and adapted to be separably connected to the said supplemental power transmitter, and means between the last said power transmitter and the aforesaid manually controlled devices for throwing the cylinder on the extension element into and out of operation.

4. The herein described extension element for extending vertically a fertilizer distributer, which latter has a body, an over-delivery beater at the rear, a traveling bottom, ground wheels, a power transmitter between the ground wheels and the beater, manual devices to throw the beater into and out of operation, a detachable rotary rake movable bodily vertically, and a sprocket wheel rotated by one of the ground wheels, the said extension element having rack-like walls to coincide with the walls of the body, a frame supporting the rack walls, an over-delivery beater on the frame, slotted supports to hold a rake such as aforesaid, and a swinging sprocket chain to drive the beater, and being adapted to be detachably secured to a spreader such as aforesaid and hold the beater approximately in the vertical plane of the axis of the lower beater and have said chain engage the teeth on one side only of said sprocket wheel, and have the rotary rake aforesaid mounted in said slotted supports, and means operable by said manual devices for manually swinging the chain to and from operative position.

5. In a mechanism of the class described, the combination of a load-carrying body, ground traction wheels, a backward-moving bottom and a distributing cylinder, of a two-element power transmitter, one element driven by and held in fixed relations to the traction wheel, and the other element held in fixed relation to the beater cylinder, the second element comprising a sprocket chain, a driven sprocket connected to the cylinder, an idler sprocket, an automatically-extensive support carrying the chain and sprocket wheels, and manually controlled means for swinging the said second element as a unit toward and from the first element.

6. The herein described extension element for extending vertically a fertilizer distributer, which latter has a load-carrying body, a rotary beater at the rear, a backward-traveling bottom, ground wheels, means for transmitting power from the ground wheels to the beater, a sprocket driving wheel, and optional devices for manually throwing the beater into and out of operation, the said extension element having rack walls adapted to coincide vertically with the side walls of said body, a framework supporting the said rack walls, a beater mounted on said framework, supports adapted to hold a rotary toothed gate to permit it to move bodily, and a swinging power transmitter for the beater including a sprocket chain, said extension element being adapted to be secured to a spreader such as aforesaid and hold the beater approximately in the vertical plane of the axis of the lower beater, and to have the said chain engage laterally with the teeth on one side only of said sprocket wheel, and also adapted to have the rotary rake applied to the aforesaid supporting guides on the extension element, and means for manually disconnecting the chain from the sprocket wheel.

In testimony whereof I affix my signature.

FRANK RAISBECK.